United States Patent
Batdorf et al.

(10) Patent No.: US 6,342,556 B1
(45) Date of Patent: Jan. 29, 2002

(54) ULTRA VIOLET LIGHT PROTECTIVE COATING

(75) Inventors: Vernon H. Batdorf, Minneapolis; Troy R. Anderson, White Bear Lake, both of MN (US)

(73) Assignee: Foster Products, Oakdale, MN (US)

( * ) Notice: Subject to any disclaimer, the term of this patent is extended or adjusted under 35 U.S.C. 154(b) by 0 days.

(21) Appl. No.: 08/632,947

(22) Filed: Apr. 16, 1996

(51) Int. Cl.$^7$ .................................................. C08K 3/18
(52) U.S. Cl. ....................................................... 524/432
(58) Field of Search .................... 524/432; 106/18.27

(56) References Cited

U.S. PATENT DOCUMENTS

| | | | | |
|---|---|---|---|---|
| 4,267,089 A | * | 5/1981 | Brown ........................ | 524/432 |
| 4,421,660 A | * | 12/1983 | Solc nee Hajna ............ | 524/432 |
| 5,049,592 A | * | 9/1991 | Kronstein .................... | 524/432 |
| 5,441,726 A | * | 8/1995 | Mitchnick et al. .......... | 524/432 |
| 5,571,855 A | * | 11/1996 | Palmer et al. ............... | 524/432 |

FOREIGN PATENT DOCUMENTS

| | | | |
|---|---|---|---|
| EP | 0 599 492 A1 | 6/1994 | |
| JP | 02169673 | * 6/1990 | .................. 524/432 |
| JP | 02-206674 | * 8/1990 | .................. 524/432 |
| JP | 6-297630 A | 10/1994 | |
| JP | 7-278465 A | 10/1995 | |
| RU | 2001085 C1 | 10/1993 | |

OTHER PUBLICATIONS

Pigmentation of Trade Sales Paints—Pigment Handbook vol. 1 & 2—edited by Temple C. Patton (1973); vol. 1, p. 47, vol. 2, pp. 85 & 80.
Antibacterial, Deodorizing, and UV Absorbing Materials Obtained with Zinc Oxide (ZnO) Coated Fabrics by Mitumasa Saito—Journal of Coated Fabrics, vol. 23, Oct. 1993.

* cited by examiner

*Primary Examiner*—Veronica P. Hoke
(74) *Attorney, Agent, or Firm*—Bin Su

(57) ABSTRACT

A coating is described which includes submicronized zinc oxide, an acrylic latex composition and a viscosity control agent, which coating when applied to a substrate prevents UV degradation and general accelerated weathering.

6 Claims, 2 Drawing Sheets

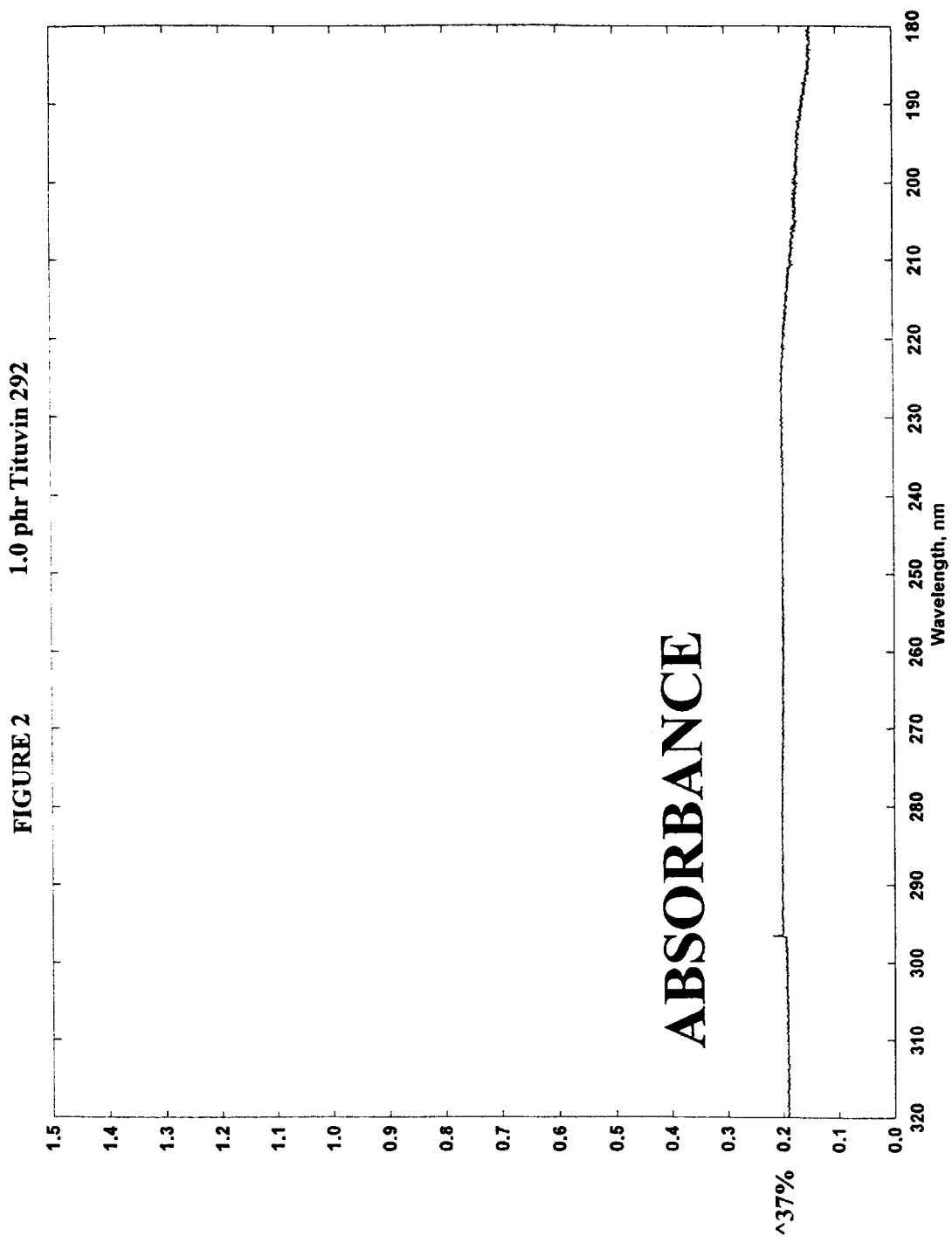
FIGURE 2  1.0 phr Tituvin 292

ULTRA VIOLET LIGHT PROTECTIVE COATING

FIELD OF THE INVENTION

The present invention relates to a coating used to protect surfaces from Ultra Violet degradation. Specifically, the present invention relates to a submicronized zinc oxide system which when used on various substrates, protects such from degradation from weathering.

BACKGROUND OF THE INVENTION

It has been known that zinc oxide is useful as a mold growth inhibitor in paints, Ultra Violet (UV) absorber in plastics, ceramics, floor tile, glass, feed additive, dietary supplement, cosmetics, and so forth. The particle sizes of such zinc oxide (ZnO), as measured by their diameter however, has been about 0.11–0.9 microns. Disadvantageously, these larger particle sizes will not provide the features of the present invention, i.e., a clear or semi-transparent coating that protects the coating itself and the substrate from UV degradation.

Previously, the use of smaller particle sizes such as taught by the present invention would have been detrimental to those oil based systems such as Alkyds and latex vehicles because ZnO is reactive with acids and chlorine groups found in these systems. This results generally in crosslinking and/or destabilization of the composition as demonstrated by increased viscosity. The final impact is that of an unstable system. Thus, the idea of using ultra-fine or submicronized zinc in a latex system as taught by the present invention would have been remote.

More recently, Sumitomo Cement Co., Japan has developed a transparent zinc oxide that has been deprived of pigment property by a unique process of turning zinc oxide into ultra fine particles (UFP), in the range of 0.005–0.015 microns. The article states that this UFP zinc oxide is monodispersed and can be applied in such forms for coated fabrics, printing inks and paints. A more complete description and discussion of this UFP zinc oxide is described in *Antibacterial, Deodorizing, and UV Absorbing Materials Obtained with Zinc Oxide (ZnO) Coated Fabrics* by Mitumasa Saito, Sumitomo Cement Co, Japan, published by Journal of Coated Fabrics, Volume 23—October 1993.

The use of zinc oxide as a UV protector is seen in Published Japanese Application JP 7-278-465. This application teaches the use of zinc oxide with an average particle diameter of about 0.01 microns or less that is mixed with a polyacrylic acid ester resin having alkoxysilane groups as its side chains. This polyacrylic acid ester is a sunproofing paint composition used on various substrates such as cellulose-based wood, cloth or paper, protein based leather or cloth, or synthetic resin based leather, cloth or paper.

European Patent Application number 0 599 492 A1 teaches the use of titanium dioxide with an average particle size of 0.005 to 0.15 micrometer and having a coating of zinc oxide or hydrated zinc oxide in an amount of at least 100 wt-% with respect to TiO2. The invention is used in products such as sunscreens in which it protects against UVA and UVB light.

JP 6-297630(A) describes a transparent, UV absorbent protective film, characterized by the fact that at least a UV absorbent layer and a protective layer containing dispersed microparticles of titanium dioxide and zinc oxide. Both ingredients have a particle diameter of 0.05 microns or less and are successively formed, either directly or via an interlying anchoring treatment layer, on one side of a base film with at least an adhesive layer formed on the other side.

None of the teachings above fulfill the need provided by the present invention which is a coating composition that utilizes submicronized zinc oxide having a particle size of about 0.01–0.08 microns in a polymer latex to produce a composition that is useful as a protectant against UV degradation and weathering for wood surfaces.

SUMMARY OF THE INVENTION

The present invention relates to the use of submicronized zinc oxide in a polymer latex. The latex binder is made by the polymerization of at least one ethylenically unsaturated monomer or the latex from the post emulsification of condensation polymers such as esters of acrylic acid and methacrylic acid, vinyl esters, dienes and the like, with an effective amount of viscosity control agent as a protectant against UV degradation and weathering on substrates such as, for example, wood, by applying a coating composition containing the above ingredients to the substrate.

Accordingly, the present invention is a coating composition comprising an exterior durable latex polymer having a solids content of about 40–65 wt-%, an effective amount of submicronized zinc oxide, water and an effective amount of viscosity control agent.

Submicronized zinc oxide is generally characterized as having an average particle size of about 0.01–0.08 microns. By using these very small particles, greatly improved visible light transmission is possible, with also greatly improved UV absorption due to the increased surface area and number of particles. Using 0.02 micron versus 0.10 micron size zinc oxide increases the surface area five fold and the number of particles 125 fold. Preferably, the submicronized zinc oxide has a particle size of about less than 0.06 microns and the viscosity control agent is a cellulosic or associative type thickener commonly used in water base coating formulations.

The present invention can also include optional ingredients such as coalescent agents, wetting aids, adhesion promoters and pigments. Also included within the scope of this invention is an article whose surface is coated with a cured layer of the compositions of the present invention. Further, the present invention may also find use as a fungicidal protective coating on food preparation floors, as a clear protective coating for all wood surfaces such as home sidings and furnishings, on vehicles, lawn equipment, farm equipment, any processing equipment, on shingles or any other roofing materials and any other substrate that requires protection from algae, fungi/bacteria growth and/or UV protection.

BRIEF DESCRIPTION OF DRAWINGS

FIG. 2 is a plot of the UV absorbency versus wavelength of a comparable sample of the invention utilizing a well known protective agent as opposed to the submicronized zinc oxide used in the present invention.

DETAILED DESCRIPTION OF THE INVENTION

Figure 1:
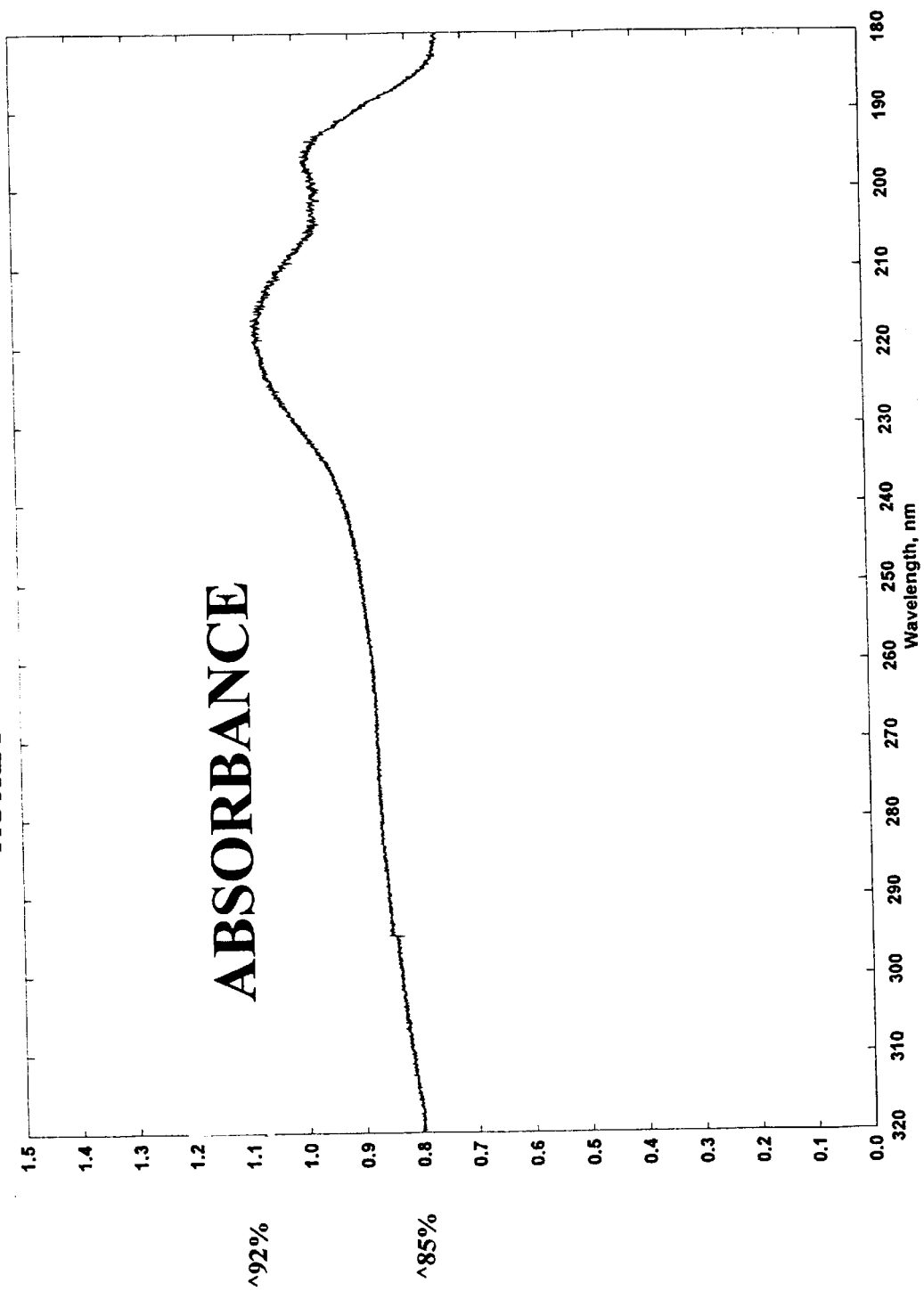
FIG. 1 is a plot of UV absorbency versus wavelength for one embodiment of a composition of the present invention.

The present invention provides a coating composition that includes an effective amount of submicronized zinc oxide. The preferred latex binder is made by the polymerization of at least one ethylenically unsaturated monomer or the latex from the post emulsification of condensation polymers such as esters of acrylic acid and methacrylic acid, vinyl esters, dienes and the like. The other ingredients include a suitable viscosity control agent and the submicronized zinc oxide. This coating composition generally is useful as a protection against UV degradation on substrates such as cedar and other suitable surfaces that require protection from the deterioration that occurs when exposed to UV light. Other optional ingredients are added to further enhance the properties of this coating composition. The process of making this composition involves blending and/or merging the undeveloped composition and is well within the conventional methods known to one of skill in the art.

Advantageously, the compositions of the present invention are also useful for floor sealers used in food preparation areas to inhibit the growth of microorganisms, as a clear protection for all wood surfaces such as home siding and furnishings, on vehicles, lawn equipment, farm equipment, any processing equipment, on shingles or any other roofing materials and any other substrate that requires protection from algae, fungal or bacterial growth and/or UV protection.

Latex

The latex used in the compositions of the present invention is preferably a latex binder made by the polymerization of at least one ethylenically unsaturated monomer or the latex from the post emulsification of condensation polymers such as esters of acrylic acid and methacrylic acid, vinyl esters, dienes and the like. Preferably, the acrylic latex has a solids content of about 40–60 wt-%. Examples of suitable acrylic lattices include, but are not limited to, those available under the trade designation "PD-0461", "PD-449", "PD-124", "PD-110", "PD-410N", "PD-600", and "PD-3391M" from H.B. Fuller Company (St. Paul, Minn.).

Generally, acrylic lattices are present in an amount to provide binding and film forming properties to the compositions. Other properties include, but are not limited to, providing a water barrier, abrasion and chemical resistance, gloss, sealing and reinforcement of the surface. In a preferred composition, acrylic lattices are present in an amount of about 20–80 wt-%. In a more preferred composition, in an amount of about 25–60 wt-% and it is most preferred in an amount of about 30–50 wt-%.

Viscosity Control Agent

Typical viscosity control agents include associative type thickeners, or hydroxyethylcellulose, carboxymethylcellulose and other modified cellulose. As it is known in the art, viscosity control agents are used to control the viscosity for improved application by brush, roller, spray or trowel. The level of viscosity modifier is preferred in an amount of about 0.1–3.0 wt-%. A more preferred amount would be about 0.1–1.0 wt-% and most preferably in an amount of about 0.01–0.6 wt-%. Examples of suitable viscosity control agents include those under the trade designation "Cellosize" from Union Carbide, (Danbury, Conn.), "Natrosol" from Hercules Powder, (Wilmington, Del.), "Methocel" from Dow Chemical, (Midland, Mich.), "Alcogum" from Alco Chemical, (Chattanooga, Tenn.) and "Rheolate" from Rheox, Inc., (Hightown, N.J.).

Water

As is usual in an aqueous solution, water is a central ingredient. In the present invention, the amount of water that is preferred is an amount of about 20–90 wt-%. In a more preferred embodiment, water is present in an amount of about 40–85 wt-% and most preferably in an amount of about 65–85 wt-%.

Submicronized Zinc Oxide

Any submicronized zinc oxide whose particles have an average diameter size of about 0.01–0.08 microns would be useful in the present invention. The submicronized zinc oxide is preferably present in an amount of about 0.2–8.0 wt-%. The more preferred amount is about 0.5–4.0 wt-% and most preferably in an amount of about 0.6–2.0 wt-%. Suitable submicronized zinc oxides are available under the trade designation of "Nyacol DP-5370" from Nyacol Products, Inc., (Valley Forge, Pa.).

Optional Ingredients

Various other ingredients can be used to improve the characteristics of the coating compositions. Such ingredients include anti-foam agents, coalescent aids, wetting aids, adhesion promoters, pigments and freeze-thaw stabilizers.

Anti-foaming agents are used to prevent foaming both during manufacturing and at the point of application. A variety of anti-foaming agents can be used in the present invention and are typically well known in the industry. Anti-foaming agents include 2-octanols, sulfonated oils, organic phosphates, silicone fluids and so forth. Anti-foaming agents that are suitable in this invention are known under the trade designations "Uraflow B" from GCA Chemical Corp., (Brandenton, Fla.), "Oxymelt A-2" from Estron Chemical Corp., (Colvert City, Ky.), "Antifoam B" from Dow Corning, (Midland, Mich.) and "Colloid 646" from Rhone-Poulenc, (Research Triangle Park, N.C.). In a preferred embodiment, the amount of anti-foaming agent used is in an amount of about 0.01–1.0 wt-%. More preferably an amount of about 0.01–0.5 wt-% is used and most preferably an amount of about 0.02–0.1 wt-% is used.

Coalescent agents may be used in the present invention to assist the polymer emulsion to coalesce into a film on drying. Coalescent agents in the present invention are generally of the category of glycol monoethers, aliphatic solvents and good plasticizers. The level of coalescent agents are at about 0.2–4.0 wt-% and preferably at about 0.4–3.0 wt-%. Examples of suitable coalescent agents include "Dowanol PnB" from Dow Chemical, (Midland, Mich.) and "Texanol Ester Alcohol" from Eastman Kodak Co., (Kingsport, Tenn.).

Generally, wetting agents are useful to aid flow, penetration and wet-out of surfaces by reducing the surface tension of the coating. Well known wetting agents are alcohols, nonionic surfactants and silicones or fluorocarbons. Wetting agents are present preferably in an amount of about 0.05–4.0 wt-% and more preferably in an amount of about 0.1–2.0 wt-%. The most preferred amount is about 0.1–1.0 wt-%. Examples of wetting agents include those known under the trade designations "Surfynol 104H" from Air Products and Chemicals, (Allentown, Pa.) and "Igepal CO-710" from Rhone Poulenc, Inc., (Research Triangle Park, N.C.).

To advance adhesion of the coating substrate, an adhesion promoter can be used in the compositions of the present invention. Typical adhesion promoters include silane resins and other polar resins with good wetting properties or reactivity. Examples of suitable adhesion promoters are available under the trade designations "Araldite GT-7220" and "Araldite GT-7013" from Ciba-Geigy Corporation, (Hawthorne, N.Y.), and "Silquest A-1120 Silane" from OSI Specialities, Inc., (Danbury, Conn.). The preferred amount of adhesion promoter in the present invention is about 0.05–2.0 wt-% and more preferably in an amount of about 0.1–1.0 wt-%. Most preferably an amount of adhesion is present in an amount of about 0.1–0.5 wt-%.

Various pigments can also be used in the present invention to provide the appropriate color to the system. These pigments are used at a low level where desired to maintain semi-transparency. Pigments can also be used as fillers, to increase cohesive strength and stiffness, reduce surface tack, and reduce abrasion. Generally, any UV stable pigment can be used in this invention. Further, two or more pigments can be combined to provide desirable characteristics in the present invention. Pigments can be classified as micas, graphite, talcs, aluminum hydrate, carbon black, lithopone, ferric/ferrous oxides, whiting, magnesium oxide or carbonate and so forth. Examples of pigment dispersions usefull in the present invention are those known under the trade designations "Aurasperse Red Iron Oxide Light, W-3040", "Aurasperse Carbon Black, W-7012", "Aurasperse Burnt Umber, W-3246", "Aurasperse Yellow Iron Oxide, W-1025" from Harshaw Chemical Co., (Cleveland, Ohio), "Special Black 100" from Degussa AG, (Frankfurt, Germany) and "Black No. 101" from The Shepard Color Company (Cincinnati Ohio).

Freeze-thaw stabilizers are generally useful to help the stability of a product that is subjected to freezing and then thawing conditions. Typically these stabilizers fall within the category of glycols or alcohols. Examples of freeze-thaw stabilizers include, but are not limited to, ethylene or propylene glycol, or ethanol from Dow Chemical Co., (Midland, Mich.).

EXAMPLES

The following examples are offered to further illustrate the various aspects and attributes of the present invention. They are, however, not intended to limit the scope of the present invention.

Example 1

A coating composition was prepared in the following manner: A clean mixer was charged with 52 wt-% of water and 0.3 wt-% of "Cellosize", a viscosity control agent. These ingredients were mixed at low speed for approximately 10 minutes or until the product was clear. The following were then added: 0.02 wt-% of "Dow Corning Antifoam B", Coalescent agents, 2.0 wt-% of "Dowanol PnB" and 0.50 wt-% of "Texaco Ester Alcohol". Wetting agents were added in the following amounts: 0.18 wt-% "Surfynol 104H", 0.17 wt-% of "IgepalCO-710", 4.70 wt-% of "Nyacol DP 5370", the 30% zinc oxide solution, and 0.20 wt-% of adhesion promoter "Silquest A-1120 Silane". These agents were mixed for about 3 minutes and lastly, 40.0 wt-% of acrylic latex binder "PD-0461" was added. The ingredients were mixed for approximately five (5) minutes.

Example 2

Example 2 was prepared in the same manner as example 1 using the same ingredients and quantities. However, the following pigments were also added: 0.99 wt-% of "Aurasperse Burnt Umber, W-3246" and 0.75 wt-% "Aurasperse Yellow Iron Oxide, W-1025" and mixed for approximately five (5) minutes. After checking for color matching, 0.30 wt-% of "Aurasperse Red Iron Oxide Light, W-3040" was added and mixed for approximately seven (7) minutes.

Example 3

Example 3 was prepared in a manner similar to example 1 using the same ingredients and quantities. In addition to those ingredients, the following were also added: 1.14 wt-% of "Aurasperse Red Iron Oxide Light, W-3040" and 0.75 wt-% of "Aurasperse Carbon Black W-7012" and mixed for approximately seven (7) minutes.

The Test

A. The test used to show the superior performance of the present invention was the Weathering test on cedar siding. A sample of the present invention was prepared in the manner described above and was brush applied on cedar siding using two (2) coats:

The test results were as follows:

1) 2000 hour Xeron weatherometer ASTM G-26. No adverse weathering effects on the cedar, coating condition excellent.

2) 1000 hour QUV weatherometer, ASTM C-732. No adverse weathering effects on the cedar, coating condition excellent.

3) Exterior Weather Rack, 45° South, 1.5 year in Houston, Tex., and Minneapolis, Minn. No adverse weathering effects on the cedar, coating condition excellent. No loss of clarity-transparency on above for the coatings.

4) When Sikkens oil based stain, a competitive semi-transparent wood product from Sikkens Co. (Division of Akzo Group, U.S. Distributor-D.L. Anderson & Assc., Maple Grove, Minn.) was used on cedar, there was a significant UV attack on the cedar, i.e., discoloration, cracking, grain raising and mold growth, based on the above tests.

B. The showing of a higher level of UV absorbency, i.e., peaking around 92% absorbency, in the sample as indicated in FIG. 1 versus FIG. 2 which shows a lower UV absorbency, i.e., a plateau of around 37% absorbency in a sample that uses "Tituvin 292" from Ciba-Geigy Corp., (Hawthorne, N.Y.), is calculated as an inverse logarithm and the results were read from a UV Spectrophotometer.

What is claimed is:

1. A coated wood panel comprising a clear, semi-transparent, protective cured coating composition comprising:

(a) an exterior durable latex polymer in an amount of about 25–60 wt-%;

(b) a submicronized zinc oxide having a particle size of an average diameter of about 0.01–0.08 micron in an amount of about 0.5–4.0 wt-%;

(c) water in an amount of about 40–85 wt-%;

(d) a viscosity modifier in an amount of about 0.1–1.0 wt-%;

said composition adhered to a wood panel.

2. A method of protecting a wood substrate from UV degradation which comprises applying to said substrate a clear, semi-transparent, protective cured coating composition comprising:

(a) an exterior durable latex polymer having a solids content of about 40–65 wt-% in an amount of about 20–80 wt-% based on total polymer content;

(b) an effective UV light absorbing amount of submicronized zinc oxide having a particle size of an average diameter of about 0.01–0.08 micron;

(c) water; and (d) an effective amount of viscosity control agent.

3. A method of protecting a wood substrate from UV degradation which comprises applying to said substrate a clear, semi-transparent, protective cured coating composition comprising:

(a) an exterior durable latex polymer in an amount of about 25–60 wt-%;
(b) a submicronized zinc oxide having a particle size of an average diameter of about 0.01–0.08 micron in an amount of about 0.5–4.0 wt-%;
(c) water in an amount of about 40–85 wt-%;
(d) a viscosity modifier in an amount of about 0.1–1.0 wt-%.

4. The method of claim 2 wherein the submicronized zinc oxide is present in an amount of about 0.2–8.0 wt-%.

5. The method of claim 2 wherein the water is present in an amount of about 20–90 wt-%.

6. The method of claim 2 wherein the viscosity control agent is present in an amount of about 0.1–3.0 wt-%.

* * * * *